US010621867B2

(12) United States Patent
Li et al.

(10) Patent No.: US 10,621,867 B2
(45) Date of Patent: Apr. 14, 2020

(54) UNMANNED AERIAL VEHICLE ASSISTED SYSTEM FOR VEHICLE REVERSE AND PARKING

(71) Applicant: Continental Automotive Systems, Inc., Auburn Hills, MI (US)

(72) Inventors: Dalong Li, Rochester Hills, MI (US); Ibro Muharemovic, Warren, MI (US); Dominik Froehlich, Royak Oak, MI (US); Steffen Hartmann, Royal Oak, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/108,502

(22) Filed: Aug. 22, 2018

(65) Prior Publication Data

US 2019/0066503 A1 Feb. 28, 2019

Related U.S. Application Data

(60) Provisional application No. 62/549,018, filed on Aug. 23, 2017.

(51) Int. Cl.
*G08G 1/14* (2006.01)
*G05D 1/00* (2006.01)
(Continued)

(52) U.S. Cl.
CPC ............ *G08G 1/143* (2013.01); *B60W 30/06* (2013.01); *G01C 21/3407* (2013.01); *G01C 21/3685* (2013.01); *G05D 1/0094* (2013.01); *G05D 1/0212* (2013.01); *G05D 1/0276* (2013.01); *G06Q 10/02* (2013.01); *G06Q 10/0832* (2013.01); *G06Q 10/0833* (2013.01); *G08G 1/012* (2013.01); *G08G 1/0175* (2013.01);
(Continued)

(58) Field of Classification Search
CPC .................................................. B62D 15/0285
USPC ........................................................ 340/932.2
See application file for complete search history.

(56) References Cited

U.S. PATENT DOCUMENTS

2005/0240323 A1 10/2005 Orita
2015/0054661 A1* 2/2015 Noh ........................ G08G 1/141
340/932.2

(Continued)

OTHER PUBLICATIONS

International Search Report and Written Opinion of the International Searching Authority dated Nov. 22, 2018 for corresponding PCT application No. PCT/2018/047696.

*Primary Examiner* — Fabricio R Murillo Garcia

(57) ABSTRACT

A method for providing vehicle assistance to a vehicle when parking in a parking lot is provided. The method includes identifying, by the path controller, one or more available parking spaces based on the one or more images. The method includes displaying, on a user interface in communication with the path controller, a representation of the identified one or more available parking spaces, and receiving, on the user interface, a driver selection of a representation of the identified one or more available parking spaces. The method includes determining, by the path controller, a path from a current position of the vehicle to an available parking space associated with the driver selection of the representation. The method includes instructing, a drive system of the vehicle, to autonomously drive the vehicle along the path.

7 Claims, 12 Drawing Sheets

(51) Int. Cl.
*G05D 1/02* (2020.01)
*G01C 21/36* (2006.01)
*G08G 1/16* (2006.01)
*G08G 5/00* (2006.01)
*G01C 21/34* (2006.01)
*G06Q 10/02* (2012.01)
*G06Q 10/08* (2012.01)
*G08G 5/04* (2006.01)
*B60W 30/06* (2006.01)
*G08G 1/01* (2006.01)
*G08G 1/017* (2006.01)
*B62D 15/02* (2006.01)
*B64C 39/02* (2006.01)

(52) U.S. Cl.
CPC ............ *G08G 1/144* (2013.01); *G08G 1/146* (2013.01); *G08G 1/166* (2013.01); *G08G 1/168* (2013.01); *G08G 5/0013* (2013.01); *G08G 5/0069* (2013.01); *G08G 5/045* (2013.01); *B62D 15/0285* (2013.01); *B64C 39/024* (2013.01); *B64C 2201/127* (2013.01); *G05D 2201/0213* (2013.01)

(56) References Cited

U.S. PATENT DOCUMENTS

| | | |
|---|---|---|
| 2016/0125736 A1* | 5/2016 | Shaik ................. G08G 1/14 701/23 |
| 2016/0180261 A1 | 6/2016 | Rosen et al. |
| 2016/0231133 A1* | 8/2016 | Johnson ............. G08G 1/143 |
| 2016/0371983 A1* | 12/2016 | Ronning ............ G01C 21/3697 |
| 2017/0092130 A1 | 3/2017 | Bostick et al. |
| 2017/0237948 A1 | 8/2017 | Quast et al. |
| 2018/0233038 A1* | 8/2018 | Kozloski ............. G08G 1/0175 |

* cited by examiner

500

```
┌─────────────────────────────────────────────────────────┐
│  Receiving, At A Path Controller, One Or More Images;   │
│                                                    502  │
└─────────────────────────────────────────────────────────┘
                            │
                            ▼
┌─────────────────────────────────────────────────────────┐
│ Identifying, By The Path Controller, One Or More        │
│ Available Parking Spaces Based On The Received One Or   │
│ More Images                                             │
│                                                    504  │
└─────────────────────────────────────────────────────────┘
                            │
                            ▼
┌─────────────────────────────────────────────────────────┐
│ Displaying, On A User Interface In Communication With   │
│ The Path Controller, A Representation Of The Identified │
│ One Or More Available Parking Spaces                    │
│                                                    506  │
└─────────────────────────────────────────────────────────┘
                            │
                            ▼
┌─────────────────────────────────────────────────────────┐
│ Receiving, On The User Interface, A Driver Selection Of │
│ A Representation Of The Identified One Or More          │
│ Available Parking Spaces                                │
│                                                    508  │
└─────────────────────────────────────────────────────────┘
                            │
                            ▼
┌─────────────────────────────────────────────────────────┐
│ Determining, By The Path Controller, A Path From A      │
│ Current Position Of The Vehicle To An Available Parking │
│ Space Associated With The Driver Selection Of The       │
│ Representation Of The Identified One Or More            │
│ Available Parking Spaces                                │
│                                                    510  │
└─────────────────────────────────────────────────────────┘
                            │
                            ▼
┌─────────────────────────────────────────────────────────┐
│ Instructing, A Drive System Of The Vehicle In           │
│ Communication With The Path Controller, To              │
│ Autonomously Drive The Vehicle Along The                │
│ Determined Path                                         │
│                                                    512  │
└─────────────────────────────────────────────────────────┘
```

```
┌─────────────────────────────────────────────────────────────┐
│ Capturing, At An Imaging Device, One Or More Images Of A    │
│ Parking Lot Having One Or More Available Parking Spaces And │
│ One Or More Unavailable Parking Spaces                      │
│                                                         702 │
└─────────────────────────────────────────────────────────────┘
```

Capturing, At An Imaging Device, One Or More Images Of A Parking Lot Having One Or More Available Parking Spaces And One Or More Unavailable Parking Spaces — 702

Receiving, At A Path Controller In Communication With The Imaging Device, The One Or More Captured Images — 704

Identifying, By The Path Controller, The One Or More Available Parking Spaces Based On The Received One Or More Images — 706

Receiving, At The Path Controller From One Or More Vehicles, Vehicle Information Associated With Each One Of The One Or More Vehicles, The Vehicle Information Including A Vehicle Identifier, A Vehicle Size, And A Vehicle Position — 708

For Each Vehicle:

Determining, By The Path Controller, A Path From The Vehicle Position Associated With The Vehicle Information To An Identified Available Parking Space From The One Or More Identified Available Parking Spaces, The Identified Available Parking Space Sized To Accommodate The Vehicle Based On The Vehicle Size — 710

Transmitting, From The Path Controller To Each Vehicle, The Determined Path — 712

FIG. 7

UNMANNED AERIAL VEHICLE ASSISTED SYSTEM FOR VEHICLE REVERSE AND PARKING

TECHNICAL FIELD

This disclosure relates to an unmanned aerial vehicle (UAV) assisted system for vehicle reverse and parking.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, semi-trailer, among others. The tow vehicle may be a car, a crossover, a truck, a semi-truck, a van, a sports-utility-vehicle (SUV), a recreational vehicle (RV), or any other vehicle configured to attach to the trailer and pull the trailer. The trailer may be attached to a powered vehicle using a trailer hitch. The trailer allows the trailer to swivel around the hitch horizontally so that the vehicle-trailer unit is able to move around corners. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Some of the challenges that face tow vehicle drivers is backing up to a specific location while being attached to the trailer because more than one person may be needed to maneuver the tow vehicle towards the specific location. Since the vehicle-trailer unit swivels around the hitch horizontally allowing the vehicle-trailer unit to move around corners, when the vehicle backs up, it pushed the trailer. Drivers are often confused as to which way to turn the vehicle steering wheel to get the desired change of direction of the trailer. Applying an incorrect steering angle in the vehicle may also cause the trailer to jack-knife and lose its course. Therefore, oftentimes, one person drives the vehicle, e.g., the driver, and another one or more people are needed to view the tow vehicle and the trailer and provide the driver with directions regarding the path that the tow vehicle has to take. In some instances, the people providing directions to the driver may have difficulty providing efficient instructions for directing the path of the tow vehicle. Moreover, the driver may not be properly trained and/or may not have enough experience to back-up the tow vehicle and the trailer. In some examples, even trained drivers may struggle with backing up the tow vehicle while attached to the trailer because the trailer may have unfamiliar dimensions or is not easily maneuvered. Other difficulties may arise while backing up the tow vehicle and the trailer, because the driver may have blind zones that do not allow adequate sight angles to properly back up the tow vehicle and the trailer. Therefore, it is desirable to provide a system that includes sensors to overcome the challenges faced by drivers of tow vehicles.

SUMMARY

One aspect of the disclosure provides a method of determining a vehicle path for a vehicle system (e.g., a vehicle or a vehicle-trailer system) for parking in a parking lot. The method includes: receiving, at a path controller, one or more images; and identifying, by the path controller, one or more available parking spaces based on the one or more images. The method also includes displaying, on a user interface in communication with the path controller, a representation of the identified one or more available parking spaces. The method also includes receiving, on the user interface, a driver selection of a representation of the identified one or more available parking spaces. The method also includes determining, by the path controller, a path from a current position of the vehicle system to an available parking space associated with the driver selection of the representation of the identified one or more available parking spaces. The method also includes instructing, a drive system of the vehicle system in communication with the path controller, to autonomously drive the vehicle system along the determined path.

Implementations of this aspect of the disclosure may include one or more of the following optional features. In some implementations, the path controller is supported by the vehicle system. In other implementations, the path controller is supported by an unmanned aerial vehicle. The path controller may communicate with the drive system of the vehicle system by way of a wireless network.

In some implementations, the method includes receiving, at the path controller, sensor data from a sensor system in communication with the path controller. The sensor system is supported by the vehicle system and configured to detect one or more objects within a proximity of the vehicle system. The method may also include updating, by the path controller, the path based on the received sensor data. In some examples, the method further includes transmitting the determined path, from the path controller to a vehicle controller in communication with the path controller. The vehicle controller is in communication with a drive system supported by the vehicle system and executing a path following sub-system. The path following sub-system executes at least one behavior causing the vehicle system to autonomously maneuver along the determined path. The method further includes capturing, at one or more imaging devices in communication with the path controller, the one or more images, at least one of the one or more imaging devices positioned at an altitude from the vehicle system and capturing images of a parking lot. In some examples, the vehicle system includes a vehicle and a trailer.

In some implementations, the method further includes receiving, at the path controller from the vehicle system, a size of the vehicle system. The method may also include identifying, by the path controller, the one or more available parking spaces based on the one or more images and the received vehicle system size.

Another aspect of the disclosure provides a method of managing parking spaces in a parking lot. The method includes receiving, at a path controller, one or more images captured by an imaging device. The method also includes identifying, by the path controller, the one or more available parking spaces based on the one or more images. The method includes receiving, at the path controller, vehicle information associated with one or more vehicle systems. The vehicle information includes a vehicle identifier, a vehicle size, and a vehicle position. The method also includes for each vehicle system: determining, by the path controller, a path from a current vehicle position to an identified available parking space from the one or more identified available parking spaces. The identified available parking space sized to accommodate the vehicle system based on the vehicle size. In addition, for each vehicle system, the method includes transmitting, from the path controller to the vehicle system, the determined path associated with each vehicle system.

Implementations of this aspect of the disclosure may include one or more of the following optional features. In some implementations, the path controller is supported by an unmanned aerial vehicle. The path controller may communicate with the one or more vehicle systems by way of a wireless network.

In some examples, the method further includes capturing at an imaging device, the one or more images of the parking lot having one or more available spaces. The imaging device may be supported by an unmanned aerial vehicle. The path controller may communicate with the imaging device by way of a wireless network.

In some implementations, the method further includes receiving, at the path controller, sensor data from a sensor system of the vehicle system. The sensor system supported by the vehicle system and configured to detect one or more objects within a proximity of the vehicle system. The method may include updating, by the path controller, the path based on the received sensor data.

In some examples, the method further includes transmitting the determined path, from the path controller to a vehicle controller of the vehicle system. The vehicle controller is in communication with a drive system supported by the vehicle system and executing a path following subsystem causing the drive system to autonomously maneuver the vehicle system along the determined path.

The imaging device may be positioned at an altitude from the vehicle system and configured to capture images of the parking lot. The vehicle system may include a vehicle attached to a trailer by way of a trailer hitch.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a schematic view of an exemplary arrangement of operations for a method that provides vehicle assistance when parking in a parking lot.

FIG. 7 is a schematic view of an exemplary arrangement of operations for a method that provides vehicle assistance when parking in a parking lot.

Like reference symbols in the various drawings indicate like elements.

DETAILED DESCRIPTION

A tow vehicle, such as, but not limited to a car, a crossover, a truck, a semi-truck, a van, a sports-utility-vehicle (SUV), and a recreational vehicle (RV) may be configured to tow a trailer. The tow vehicle connects to the trailer by way of a trailer hitch. It is desirable to have a vehicle-trailer system that can autonomously back-up to a specific location, for example, a parking space in a parking lot. The vehicle-trailer system is in communication with an unmanned aerial vehicle (UAV) that captures one or more images of the parking lot and identifies one or more parking spots that the vehicle-trailer system may autonomously drive to and back-up towards one of the one or more parking spaces. As such, a vehicle-trailer system provides a driver with a safer and faster experience when trying to park the vehicle-trailer system in a parking lot, by providing the vehicle-trailer system with the location of one or more available parking spaces within the parking lot, and allowing the driver to select one of the one or more available parking spaces, which allows the vehicle-trailer system to autonomously maneuver and back-up to the selected available parking space. In some examples, the vehicle-trailer system receives information from the UAV indicating that the parking lot has more than one available parking space. In this case, the driver may select, via a user interface, which parking space from the available parking spaces the driver wants to park his/her vehicle-trailer system. Therefore, the top view of the parking lot, provided by the UAV, provides better determination of a path, and avoids blind spots, for example, when the vehicle includes a camera and the trailer does not include a camera. Moreover, the UAV is capable of detecting and reporting multiple parking spaces that the user may identify for parking the vehicle-trailer system.

Figure 1A:
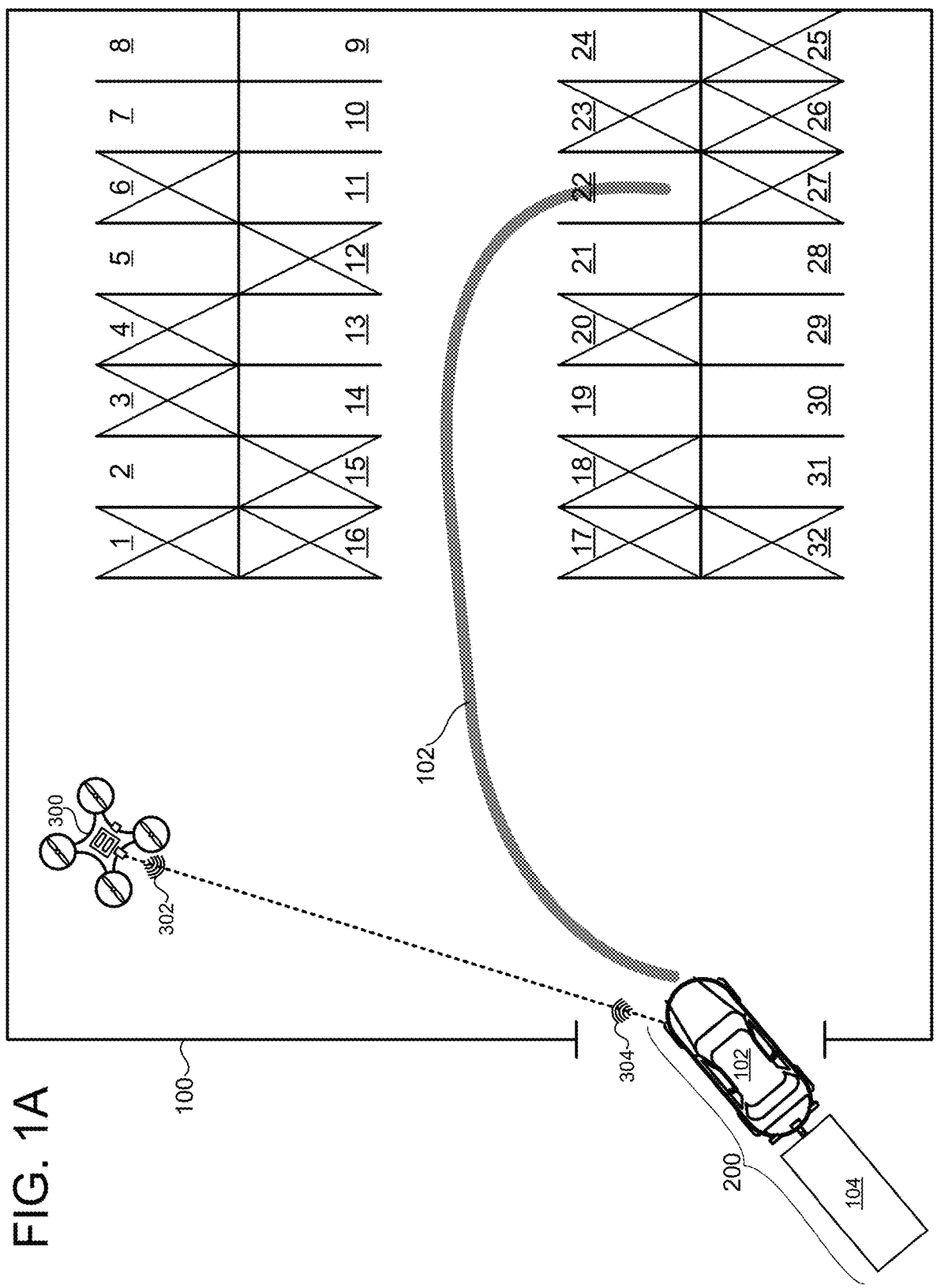
FIGS. 1A and 1B are schematic views of an exemplary unmanned aerial vehicle assisted system for vehicle reverse and parking.
Figure 1B:
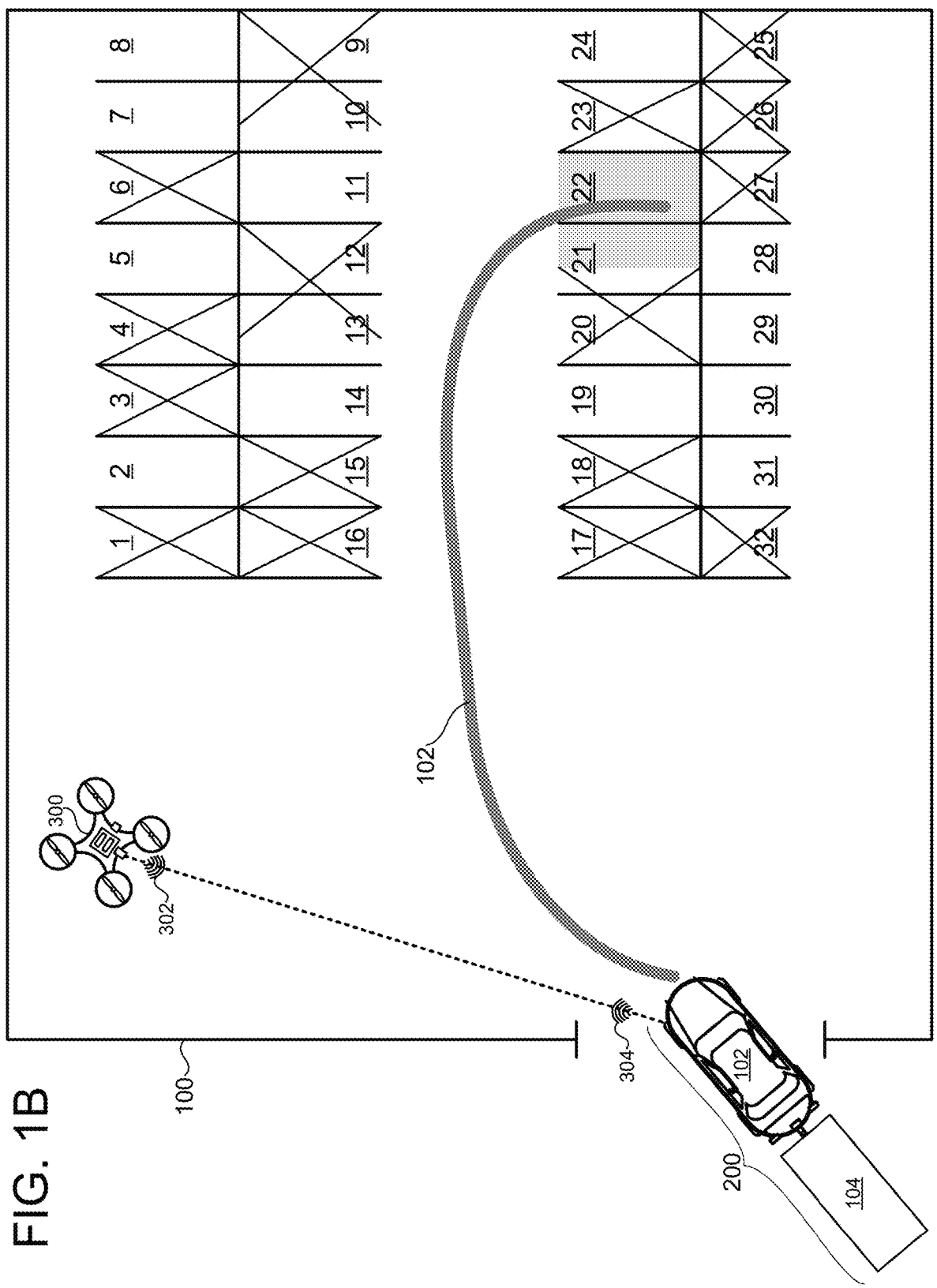

Referring to FIGS. 1A and 1B, in some implementations, a parking lot 100 may have one or more parking spaces 1-32 available for one or more vehicle-trailer systems 200 to park. The parking lot 100 may be associated with one or more unmanned aerial vehicles (UAVs) 300 that communicate with a vehicle-trailer system 200 entering the parking lot 100. The UAVs 300 provide the vehicle-trailer system 200 with information 302 relating to one or more available parking spaces 1-32. As such, a driver of the vehicle-trailer system 200 may select one of the one or more available parking spaces 1-32 that the driver wants the vehicle-trailer system 200 to autonomously maneuver towards. Upon the driver selection of an available parking space 1-32, the vehicle-trailer system 200 autonomously maneuvers to the selected parking space, positioning the vehicle-trailer system 200 within the selected parking space 1-32. In some examples, the vehicle-trailer system 200 is parked such that the vehicle 202 enters the selected parking space 1-32 first, i.e., forward parking; while in other examples, the vehicle-trailer system 200 is parked such that the trailer 204 enters the selected parking space 1-32 first, i.e., back-up parking.

Figure 2A:
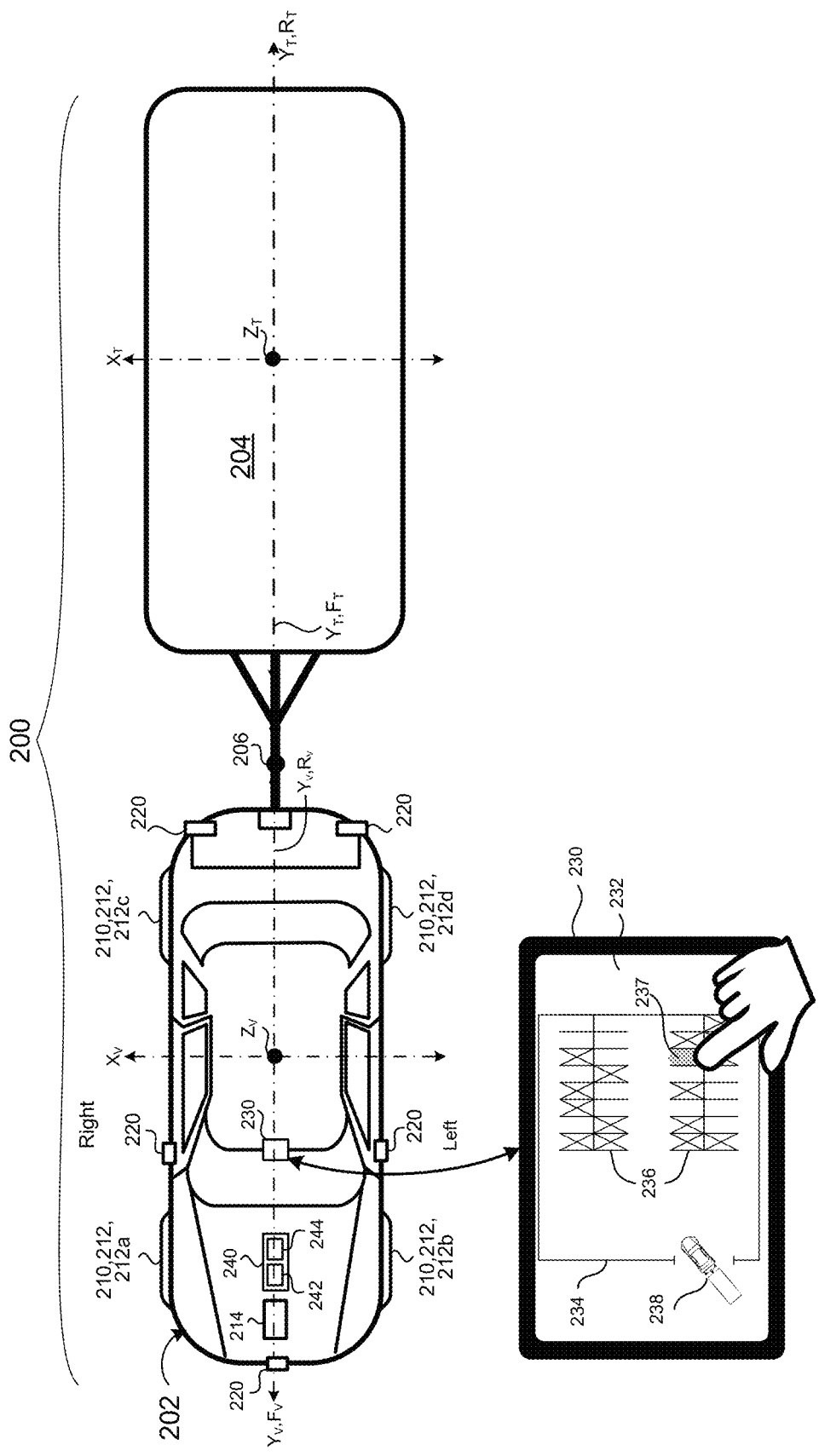
FIGS. 2A and 2B are schematic views of an exemplary vehicle-trailer system of FIGS. 1A and 1B.
Figure 2B:
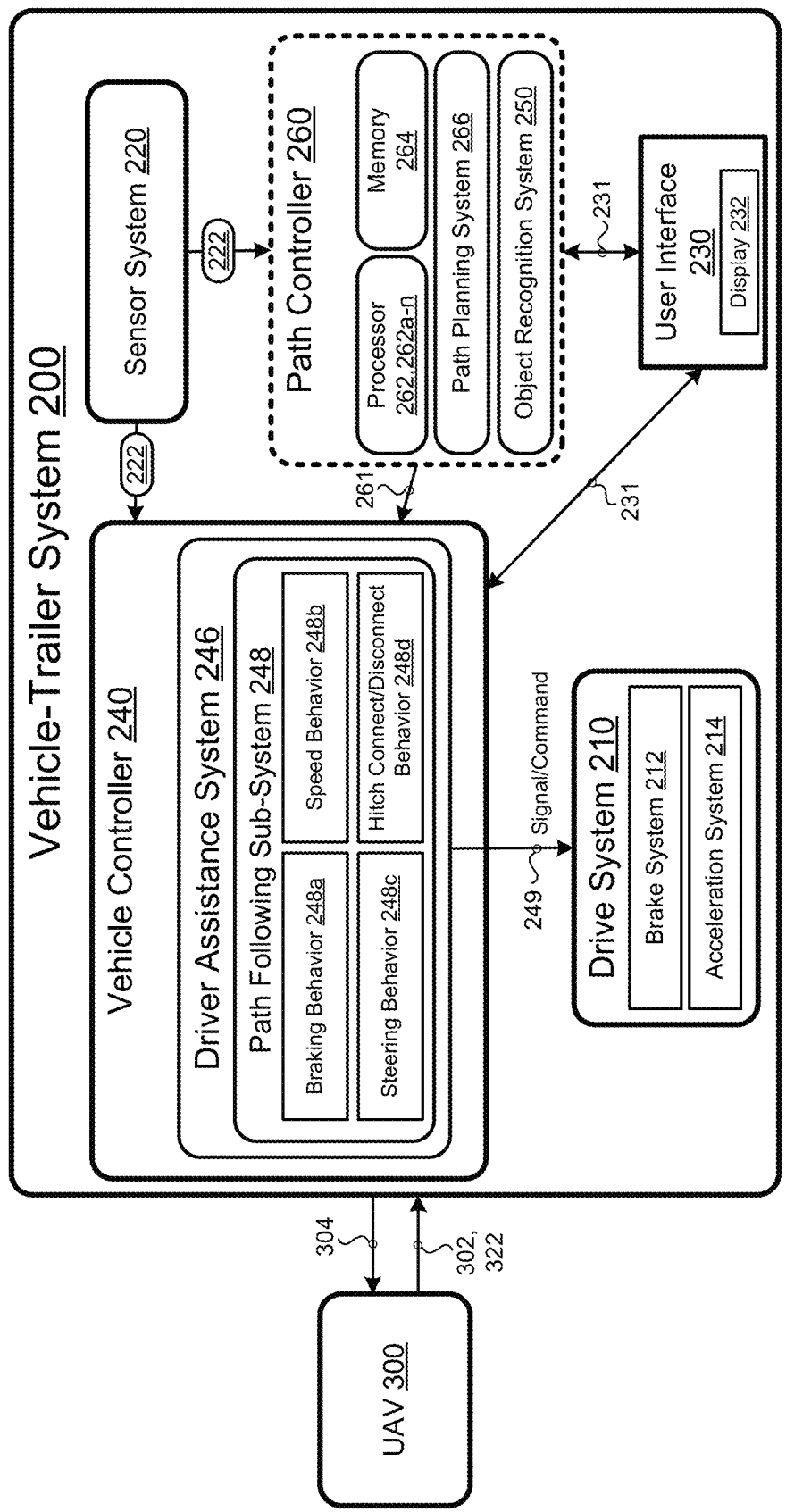

Referring to FIGS. 2A and 2B, the vehicle-trailer system 200 includes a tow vehicle 202 attached to a trailer 204 by way of a hitch 206. The tow vehicle 202 includes a drive system 210 associated with the tow vehicle 202 that maneuvers the vehicle 202 and thus the vehicle-trailer system 200 across a road surface based on drive commands having x, y, and z components, for example. As shown, the drive system 210 includes a front right wheel 212, 212a, a front left wheel 212, 212b, a rear right wheel 212, 212c, and a rear left wheel 212, 212d. In addition, the drive system 210 may include wheels (not shown) associated with the trailer 204. The drive system 210 may include other wheel configurations as well. The drive system 210 may include an engine 214 that converts one form of energy into mechanical energy allowing the vehicle 202 to move. The engine 214 may be a heat engine that burns a fuel to create heat, which is then used to create a force, or an electric engine that converts electrical energy into mechanical motion. Other types of engines may also be used. The drive system 210 includes other components (not shown) that are in communication with and connected to the wheels 212 and engine 214 and that allow the vehicle 202 to move, thus moving the trailer 204 as well. The drive system 210 may also include a brake system 216 that includes brakes (not shown) associated with each wheel 212, 212a-d, where each brake is associated with a wheel 212a-n and is configured to slow down or stop the wheel 212a-n from rotating. The vehicle-trailer system 200 may also include an acceleration system 218 that is configured to adjust a speed and direction of the vehicle-trailer system 200. The vehicle-trailer system 200 may include other systems as well.

The tow vehicle 202 may move across the road surface by various combinations of movements relative to three mutually perpendicular axes defined by the tow vehicle 202: a transverse axis Xv, a fore-aft axis Yv, and a central vertical axis Zv. The transverse axis Xv, extends between a right side R and a left side of the tow vehicle 202. A forward drive direction along the fore-aft axis Yv is designated as Fv, also referred to as a forward motion. In addition, an aft or rearward drive direction along the fore-aft direction Yv is designated as Rv, also referred to as rearward motion. In some examples, the tow vehicle 202 includes a suspension system (not shown), which when adjusted causes the tow vehicle 202 to tilt about the Xv axis and or the Yv axis, or move along the central vertical axis Zv. As the tow vehicle 202 moves, the trailer 204 follows along a path of the tow vehicle 202. Therefore, when the tow vehicle 202 makes a turn as it moves in the forward direction Fv, then the trailer 204 follows along. While turning, the tow vehicle 202 and the trailer 204 have a turn angle (not shown) between one another about a trailer hitch 206 connecting the tow vehicle 202 and the trailer 204 together.

Moreover, the trailer 204 follows the tow vehicle 202 across the road surface by various combinations of movements relative to three mutually perpendicular axes defined by the trailer 204: a trailer transverse axis XT, a trailer fore-aft axis YT, and a trailer central vertical axis ZT. The trailer transverse axis XT, extends between a right side R and a left side of the trailer 204. A forward drive direction along the trailer fore-aft axis YT is designated as FT, also referred to as a forward motion. In addition, a trailer aft or rearward drive direction along the fore-aft direction YT is designated as RT, also referred to as rearward motion. Therefore, movement of the vehicle-trailer system 200 includes movement of the tow vehicle 202 along its transverse axis Xv, fore-aft axis Yv, and central vertical axis Zv, and movement of the trailer 204 along its trailer transverse axis XT, trailer fore-aft axis YT, and trailer central vertical axis ZT.

With continued reference to FIGS. 2A and 2B, in some implementations, the vehicle 202 includes a sensor system 220 to provide reliable and robust autonomous driving. The sensor system 220 provides sensor data 222 and may include different types of sensors that may be used separately or with one another to create a perception of the tow vehicle's environment that is used for the vehicle-trailer system 200 to autonomously drive and make intelligent decisions based on objects and obstacles detected by the sensor system 220. In some examples, the vehicle 202 supports the sensor system 220; while in other examples, the sensor system 220 is supported by the vehicle 202 and the trailer 204. The sensors may include, but not limited to, one or more imaging devices (such as cameras), and sensors such as, but not limited to, radar, sonar, LIDAR (Light Detection and Ranging, which can entail optical remote sensing that measures properties of scattered light to find range and/or other information of a distant target), LADAR (Laser Detection and Ranging), etc. In addition, the camera(s) and the sensor(s) may be used to alert the driver of possible obstacles when the tow vehicle 202 is traveling in the forward direction Fv or in the rearward direction Rv, by way of audible alerts and/or visual alerts via the user interface 230. Therefore, the sensor system 220 is especially useful for increasing safety in the vehicle-trailer system 200 which operate under semi-autonomous or autonomous conditions.

The tow vehicle 202 may include a user interface 230, such as, a display. The user interface 230 receives one or more user commands from the driver via one or more input mechanisms or a touch screen display 232 and/or displays one or more notifications to the driver. In some examples, the user interface is a touch screen display 232; as such, the driver may point his finger and select a representation 236 of an available parking space 1-32. In other examples, the user interface 230 is not a touchscreen and the driver may use an input device, such as, but not limited to, a rotary knob or a mouse to select one of the available parking space representations 236.

The user interface 230 is in communication with a vehicle controller 240. The vehicle controller 240 includes a computing device (or data processing hardware) 242 (e.g., central processing unit having one or more computing processors) in communication with non-transitory memory or hardware memory 244 (e.g., a hard disk, flash memory, random-access memory) capable of storing instructions executable on the computing processor(s)). As shown, the vehicle controller 240 is supported by the tow vehicle 202; however, the vehicle controller 240 may be separate from the tow vehicle 202 and in communication with the tow vehicle 202 via a network (not shown). In addition, the vehicle controller 240 is in communication with the UAV 300, and receives images and data 302 from the UAV 300. In some examples, the user interface 230 displays an image of an environment of the vehicle 202 or the vehicle-trailer system 200 based on data 222 received from the sensor system 220 and from images and data 302 received from the UAV 300.

In some implementations, the vehicle-trailer system 200 includes a path controller 260 to improve the autonomous driving of the vehicle-trailer system 200. The path controller 260 includes a computing device (or data processing hardware) 262 (e.g., central processing unit having one or more computing processors) in communication with non-transitory memory or hardware memory 264 (e.g., a hard disk, flash memory, random-access memory). The non-transitory memory 264 stores instructions that when executed on the one or more processing units 262 cause the path controller 260 to provide an output 261, such as a planned path 102 (FIGS. 1A and 1B).

In some implementations, the path controller 260 is configured to process images which leads to identifying the vehicle-trailer system 200, the available and un-available parking spaces 1-32, and plan a path 102 for the vehicle-trailer system 200 to autonomously maneuver along to reach a selected available parking space 1-32.

In some implementations, the path controller 260 executes an object recognition system 250. The object recognition system 250 processes the images and data 302 received from the UAV 300 and identifies a top view representation 234 of the parking lot 100 that includes parking space representations 236 of the parking spaces 1-32, including the available and the non-available spaces 1-32, and one or more vehicle-trailer systems 200 located in the parking lot 100. In some examples, the object recognition system 250 determines the size of the available parking spaces 1-32 based on the images 322 and data 302 received from the UAV 300 and recommends an available parking space 1-32 based on whether the vehicle-trailer system 200 fits in the available parking space 1-32. In some examples, and also based on the images 322 and data 302 received from the UAV 300, the vehicle controller 240 determines a distance from the vehicle-trailer system 200 to the one or more of the available parking spaces 1-32. The object recognition system 250 may instruct the user interface 230 to display the determined distances to the one or more available parking spaces 1-32. As such, the driver and/or the vehicle-trailer system 200 may consider the determined distances when selecting an available parking space 1-32.

The object recognition system 250 may also consider the ease of the vehicle-trailer system 200 maneuvering within the parking lot 100 to reach an available space 1-32. In some situations, the parking lot 100 is very large and it may be more difficult for a vehicle-trailer system 200 to autonomously maneuver itself to some parking spaces 1-32, as such, the object recognition system 250 may consider the ease or difficulty of the vehicle-trailer system 200 maneuvering along the path to the available parking space 1-32 before making a space recommendation. For example, the vehicle-trailer system 200 considers the number of turns to reach an available parking space 1-32. In cases where the vehicle-trailer system 200 determines that the vehicle-trailer system 200 cannot reach a parking space 1-32, then the display 232 may not show that the unreachable space is available.

The object recognition system 250 may instruct the user interface 230 (via one or more signals or messages 231) to display one or more of the size of the available parking spaces, the distance to each available parking space, and the ease of parking within a specific available parking space. As such, the driver can make a better determination of which available parking space 1-32 to select. The vehicle controller 240 sends a command to the user interface 230 to display the top view representation 234 of the parking lot 100 that includes parking space representations 236 of the parking spaces 1-32, including the available and the non-available spaces 1-32, in addition to any relevant parking space information, such as, but not limited to, the size of the available one or more parking spaces, the distance of the vehicle-trailer system 200 to one or more available parking spaces 1-32, and the ease of parking within a specific available parking space. In addition, the display screen 232 also displays a vehicle-trailer system representation 238 of the vehicle-trailer system 200.

The user display 232 is configured to receive an indication of a driver selection 237 associated with a selected parking space representation 236. The indication of the driver selection 237 is indicative of an available parking space 1-32 identified by the vehicle controller 240 that the driver wants the vehicle-trailer system 200 to autonomously drive to and then park the vehicle-trailer system 200 within the selected parking space 1-32.

In some implementations, the path controller 260 receives the sensor data 222 from the sensor system 220, the driver selection 237 of the selected available parking space 1-32, and images 322 and data 302 from the UAV 300 and based on the received images 322 and data 302 provides a planned path 102 for the vehicle-trailer system 200 to autonomously follow to move from its current location to the selected available parking space 1-32.

Therefore, when the driver selects which available parking space 1-32 he/she wants the vehicle-trailer system 200 to autonomously drive to, a path planning system 266 executing on the path controller 260 plans a path 102 (FIGS. 1A and 1B) between the vehicle-trailer system 200 and the selected available parking space 1-32. The path planning system 266 may determine the planned path based on learned behaviors. The path planning system 266 may also determine how the vehicle-trailer system 200 will autonomously maneuver towards the selected available parking space 1-32. In some examples, the path planning system 266 instructs the user interface 230 to ask the driver if he/she wants to pull in the available parking space 1-32 with the front portion of the vehicle-trailer system 200 (i.e., the vehicle 202) entering the available parking space 1-32 first, or back into the available parking space 1-32 with the rear portion of the vehicle-trailer system 200 (i.e., the trailer 204) entering the available parking space 1-32 first. Upon the driver selection, the path planning system 266 plans the path 102 accordingly. Therefore, the path 102 may include maneuvering the vehicle-trailer system 200 in a forward direction Fv, FT, a rearward direction Rv, RT, or a combination thereof. Moreover, a destination of the path 102 positions the vehicle-trailer system 200 in an orientation aligned generally parallel with at least one line defining the parking space 1-32. In other words, the fore-aft axis Yv of the vehicle 202 and the fore-aft axis YT of the trailer 204 are parallel and aligned generally parallel with at least one line defining the parking space 1-32.

In some examples, the path controller 260 includes one or more artificial neural networks (ANN) (not shown), for example, a Deep neural network (DNN) ANNs are computing systems inspired by the biological neural networks that constitute animal brains. The ANNs learn to do tasks by considering examples, generally without task-specific programming. For examples, in image recognition, the ANN may learn to identify images that contain vehicle-trailer system 200 that have been labeled as "vehicle-trailer system", or empty parking spaces 1-32 labeled as "empty parking spaces", and using the analytic results to identify vehicle-trailer system 200 and empty parking spaces 1-32 in other images. ANNs are based on a collection of connected units called artificial neurons, which are similar to axons in a biological brain. Each connection between two neurons can transmit a signal to another neuron. The neurons and connections may have a weight that varies as learning proceeds.

The ANN may be trained to recognize the vehicle-trailer system 200, the available and un-available parking spaces 1-32, and plan the path 102 for the vehicle-trailer system 200 to autonomously maneuver along to reach a selected available parking space 1-32. The ANN may be trained based on two typed of training, a dynamic training or end-to-end training, and a stating training for determining a path 102 for the vehicle-trailer system 200. During the dynamic training or end-to-end training, the UAV 300 is trained on how to drive from a current location to a destination, i.e., to the available space 1-32 in the parking lot 100. Static training trains the ANN to plan the path 102 based on the received images 322 from the UAV 300. The path information is then transmitted to the drive system 210 allowing the vehicle-trailer system 200 to maneuver reaching its final destination.

As the vehicle-trailer system 200 is autonomously maneuvering towards the available parking space 1-32 based on the planned path 102, the path planning system 266 continuously updates the planned path 102 based on continuously receiving images and data 302 from the UAV 300 and sensor data 222 from the vehicle sensor system 220. In some examples, the path controller 260 identifies one or more objects along the planned path 102 and sends the path planning system 266 data relating to the position of the one or more objects. In this case, the path planning system 266 may recalculate the planned path 102 to avoid the one or more objects. In some examples, the path planning system 266 determines a probability of collision and if the probability of collision exceeds a predetermined threshold, the path planning system 266 adjusts the path 102 and sends it to the driver assistance system 246.

The path planning system 266 transmits the planned path 102 to the vehicle controller 240, and in some examples, continuously updates the planned path 102 as the vehicle-trailer system 200 is autonomously maneuvering towards the available parking space 1-32. Once the vehicle controller 240 receives the planned path 102, the vehicle controller 240 executes a driver assistance system 246, which in turn includes a path following sub-system 248. The path following sub-system 248 received the planned path 102 and executes behaviors 248a-248e that send commands 249 to the drive system 210, leading to the vehicle-trailer system 200 to autonomously drive along the planned path 102.

The path following sub-system 248 may include one or more behaviors, such as, but not limited to, a braking behavior 248a, a speed behavior 248b, a steering behavior 248c, and a hitch connect/disconnect behavior 248d. Each behavior 248a-d causes the vehicle-trailer system 200 to take an action, such as driving forward or backward, turning at a specific angle, breaking, speeding, slowing down, among others. The vehicle controller 240 may maneuver the vehicle-trailer system 200 in any direction across the road surface by controlling the drive system 210, more specifically by issuing commands 249 to the drive system 210.

The braking behavior 248a may be executed to either stop the vehicle-trailer system 200 or to slow down the vehicle-trailer system 200 based on the planned path 102. The braking behavior 248a sends a signal or command 249 to the drive system 210, e.g., the brake system (not shown), to either stop the vehicle-trailer system 200 or reduce the speed of the vehicle-trailer system 200.

The speed behavior 248b may be executed to change the speed of the vehicle-trailer system 200 by either accelerating or decelerating based on the planned path 102. The speed behavior 248b sends a signal or command 249 to the brake system 216 for decelerating or the acceleration system 218 for accelerating.

The steering behavior 248c may be executed to change the direction of the vehicle-trailer system 200 based on the planned path 102. As such, the steering behavior 248c sends the acceleration system 214 a signal or command 249 indicative of an angle of steering causing the drive system 210 to change direction.

The hitch connect/disconnect behavior 248d may be executed to connect or disconnect the vehicle 202 from the trailer 204. As such, the hitch connect/disconnect behavior 248d sends the drive system 210 a signal or command 249 indicative of releasing or connecting the vehicle 202 from/to the trailer 204.

Figure 2C:
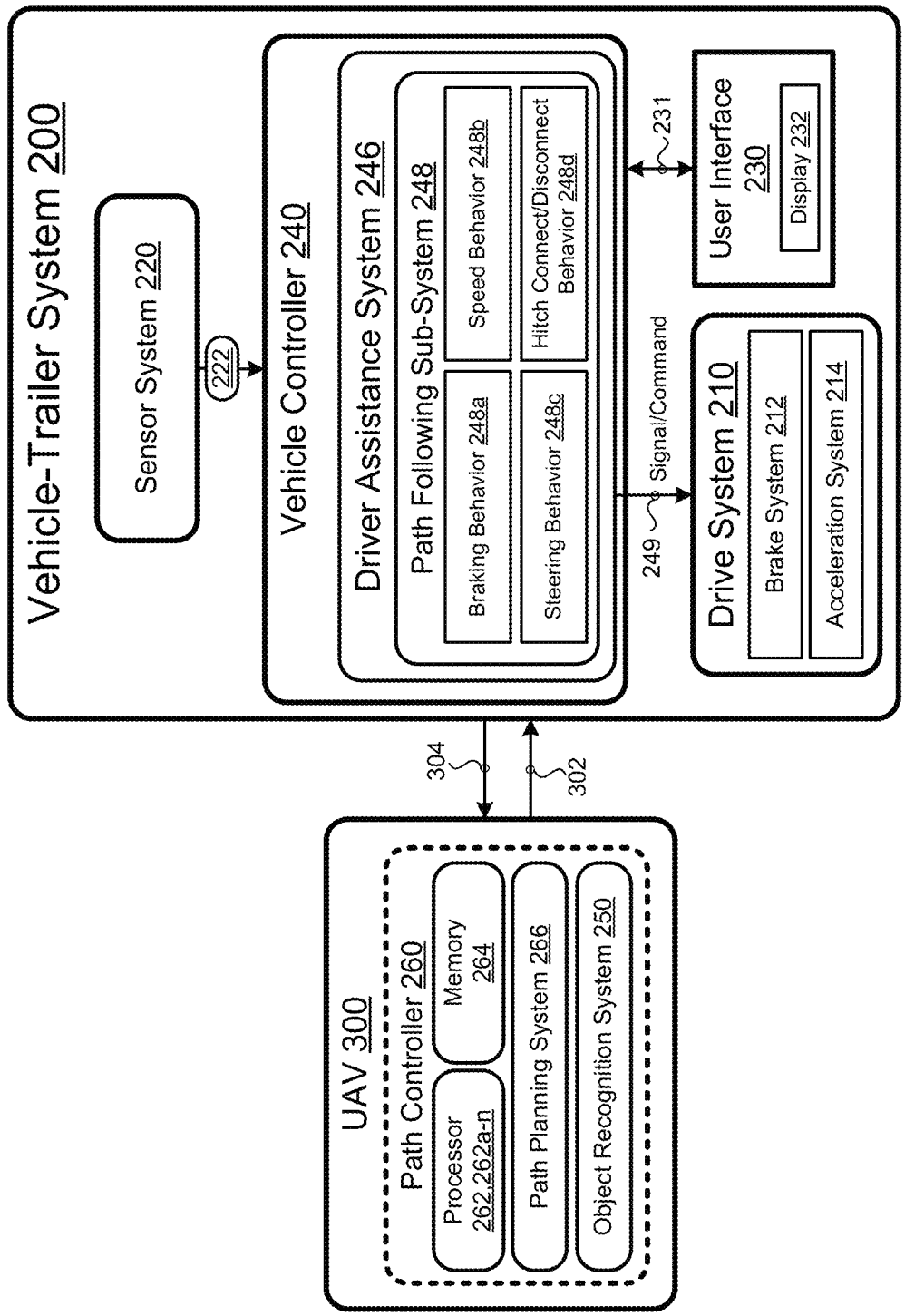
FIG. 2C is a schematic view of an exemplary vehicle-trailer system in communication with an unmanned aerial vehicle (UAV).

Referring to FIG. 2C, in some implementation, the UAV 300 includes and supports the path controller 260. In this case, the path controller 260 executes the object recognition system 250 which processes the images and data 302 captured by the UAV 300 and identifies a top view representation 234 of the parking lot 100 that includes parking space representations 236 of the parking spaces 1-32, including the available and the non-available spaces 1-32, and one or more vehicle-trailer systems 200 located in the parking lot 100, as described above. As shown, the path controller 260 communicates with the vehicle-trailer system 200, such that the vehicle-trailer system 200 sends a vehicle signal 304 to the UAV 300 when the vehicle-trailer system 200 is within a predefined distance from the parking lot 100. The UAV 300 identifies the vehicle-trailer system 200 within the captured images 322 and monitors the location and movement of the vehicle-trailer system 200. The vehicle-trailer system 200 may continuously or at specific time intervals send the UAV 300 its location. The UAV 300 can then plan the path 102 for the vehicle-trailer system 200 to reach an available parking space 1-32 identified by the driver.

Figure 3:
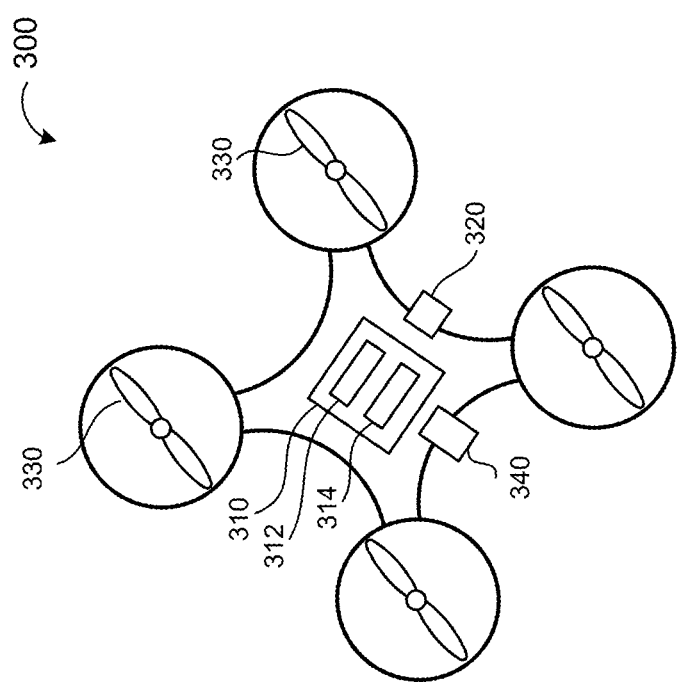
FIG. 3 is a schematic view of an exemplary UAW of FIGS. 1A and 1B.

FIG. 3 shows the UAV 300, also referred to as a drone, which is an aircraft without a human pilot aboard. The UAV 300 may be part of a drone system that includes a ground-based controller (not shown), additional one or more UAVs 300, and a communication system between the one or more drones and the ground-based controller. Each UAV 300 may operate either under remote control by a human or autonomously by an onboard processing device 312. The UAV 300 includes an equipment box 310 that includes a data processing device 312 and memory hardware 314 in communication with the data processing device 312. The data processing device 312 executes algorithms stored on the memory hardware 314 to determine the travel path of the UAV 300. The UAV 300 includes a payload 320, such as a camera, in communication with the data processing device 312. The camera 320 is configured to capture images 322 of the ground below the UAV 300 and transmit the captured images to the data processing device 312 or the path controller 260 (FIG. 2D) of the UAV 300 or to the vehicle-trailer system 200. With additional reference to FIG. 2D, when the path controller 260 is included in the UAV 300, the object recognition system 250 receives the images 322 and processes the received images 322 and identifies a top view representation 234 of the parking lot 100 that includes parking space representations 236 of the parking spaces 1-32, including the available and the non-available spaces 1-32. Once the top view representation 234 of the parking lot is determined, the path planning system 266 determines a path 102 for the vehicle-trailer system 200 to follow. Once the path planning system 266 determines the path 102, the UAV 300 sends the planned path 102 to the vehicle-trailer system 200, which receives the planned path 102 and executes the driver assistance system 246 causing the vehicle-trailer system 200 to follow the received planned path 102. In some examples, the UAV 300 continuously updates the planned path 102 and sends the updated path 102 to the vehicle-trailer system 200.

Figure 4A:
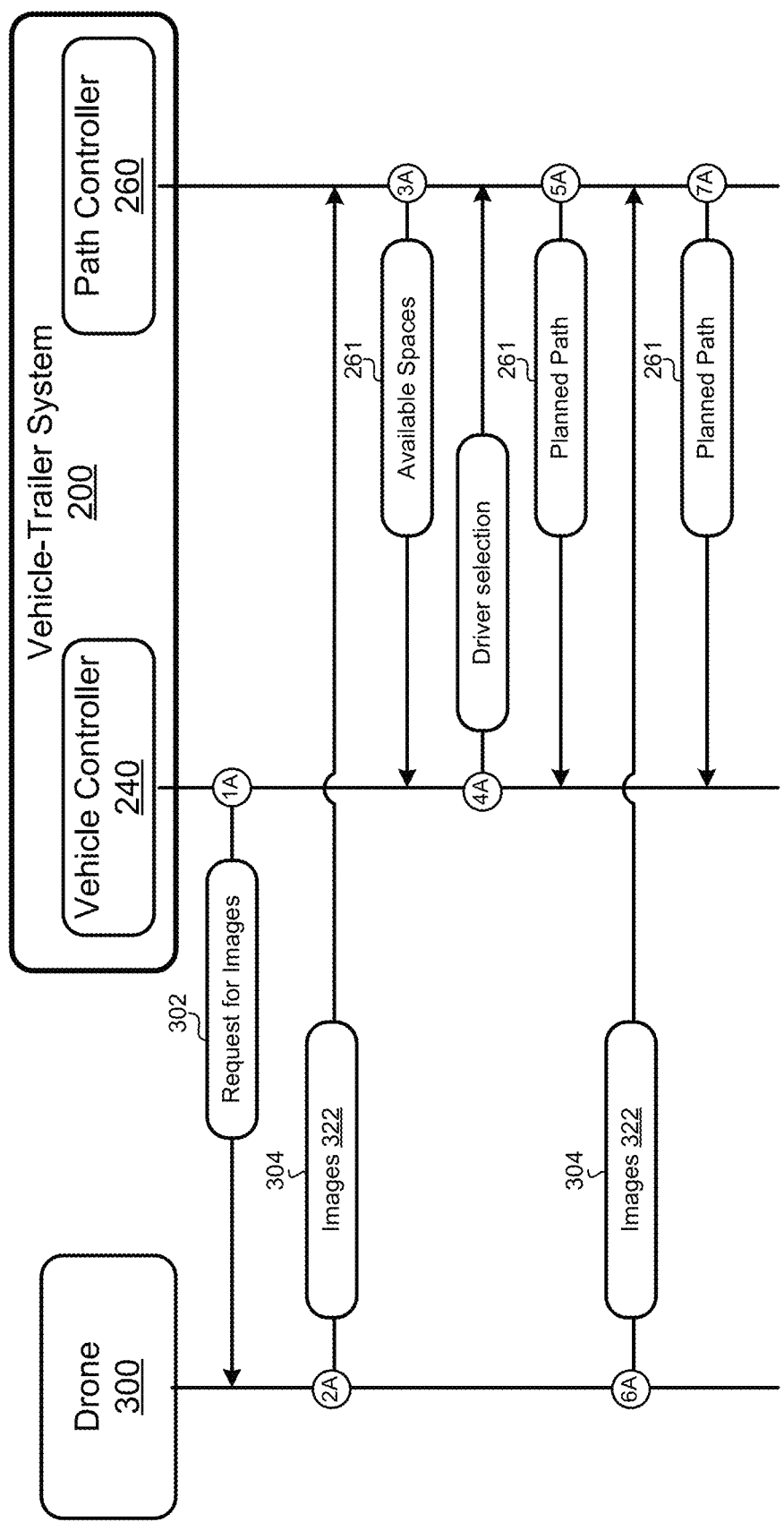
FIG. 4A is a schematic view of the communication between devices in an exemplary UAV assisted system, where the path controller is part of the vehicle-trailer system.

FIG. 4A illustrates and exemplary communication between a vehicle-trailer system 200 and a UAV 300, where the vehicle-trailer system 200 includes the ANN, as described in FIGS. 1A-2A, 2B and 3. In some implementations, when the vehicle-trailer system 200 is within the parking lot 100 or within a predetermined distance from the parking lot 100, the vehicle controller 240 requests one or more images 322 from the UAV 300, at step 1A. At step 2A, the UAV 300 transmits captured images 322 to the vehicle-trailer system 200, specifically the path controller 260. At step 3A, the path controller 260 analyses the received images 322 and identifies one or more available parking spaces 1-32. The path controller 260 sends the vehicle controller 240 the identified one or more available parking spaces 1-32, and the vehicle controller 240 in turn instructs the user interface 230 to display the identified one or more available parking spaces 1-32. Once the driver makes a selection of one of the identified one or more available parking spaces 1-32, the user interface 230 transmits the selection to the vehicle controller 240 (or in some examples, to the path controller 260) at step 4A. At step 5A, the path controller 260 determines a path 102 from a current location of the vehicle-trailer system 200 to the selected available parking spaces 1-32 and sends the planned path 102 to the vehicle controller 240. The vehicle controller 240 executes the driver assistance system 246 which allows for autonomous driving of the vehicle-trailer system 200 to the selected available parking spaces 1-32. At step 6A, the UAV 300 continuously sends images to the path controller 260, which in turn continuously updates the planned path 102 and sends it to the vehicle controller 240 until the vehicle-trailer system 200 reaches its final destination along the planned path 102.

Figure 4B:
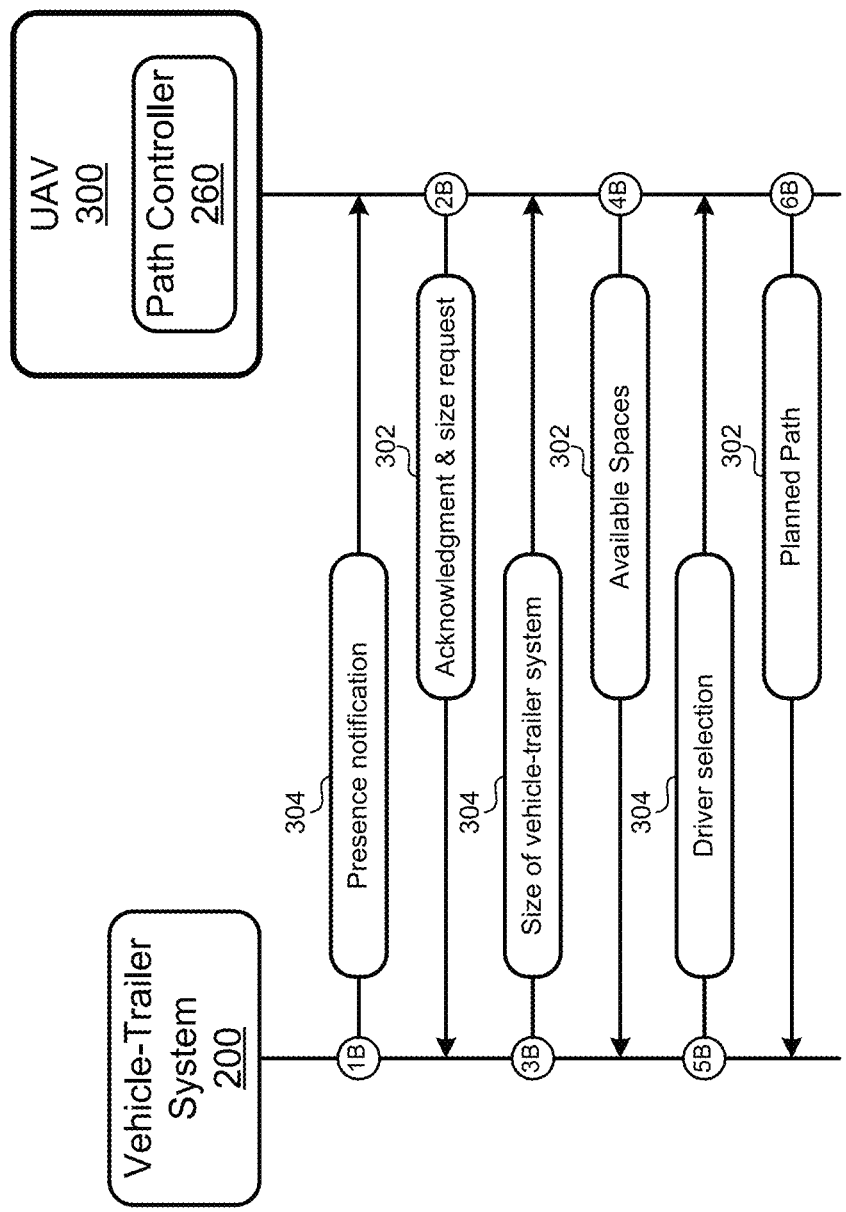
FIG. 4B is a schematic view of the communication between devices in an exemplary UAV assisted system, where the path controller is part of the UAV.

FIG. 4B illustrates an exemplary communication between a vehicle-trailer system 200 and a UAV 300 as described with reference to FIGS. 1A-2A, 2C and 3. At step 1B, the vehicle-trailer system 200 arrives at the parking lot 100 or is within a predetermined distance from the parking lot and notifies the UAV 300 of an interest to park the vehicle-trailer system 200 in an available parking space 1-32. At step 2, the UAV 300 acknowledges the presence notification from the vehicle-trailer system 200 and requests that the vehicle-trailer system 200 sends the UAV 300 its size. At step 3, the vehicle-trailer system 200 sends the UAV 300 its size. At step 4, the UAV 300 captures images and executing the path controller 260 identifies one or more available spaces 1-32 within the parking lot 100. Referring to FIG. 1A, in some examples, all the parking spaces 1-32 are the same size and are configured to fit the vehicle-trailer system 200. However, as shown in FIG. 1B, the parking spaces 1-32 may have varying sizes and/or some vehicle-trailer systems 200 parked in the parking lot 100 may take up more than one space 1-32 due to their size. For example, the vehicle-trailer system 200 parked in spaces 9, 10, or 12, 13, or 20, 21 have taken additional spaces than the space allocated to each vehicle-trailer system 200. In such case, the path controller 260 determined the available spaces based on a combination of the marked spaces and the space availability between the vehicle-trailer systems 200. Referring back to FIGS. 1A-2A, 2D and 3, the UAV 300 determines available spaces 1-32 based on the size of the vehicle-trailer system 200 and at step 4 sends the vehicle-trailer system 200 a representation 234 of the parking lot 100 including representations 236 of available parking spaces 1-32. In some examples, the UAV 300 also sends information relating to the size of each available parking space 1-32, the distance from the vehicle-trailer system 200 to the available parking space 1-32, and the ease of the vehicle-trailer system 200 to maneuver to the available parking space 1-32. Then, the vehicle-trailer system 200 instructs the user interface 230 to display the received information on the display screen 232 allowing the driver to select a representation 236 of an available parking space 1-32. Once selected, at step 5, the vehicle-trailer system 200 transmits the driver selection 237 to the UAV 300. The UAV 300 begins planning a path 102 based on the driver selection 237, and at step 6 transmits the planned path 102 to the vehicle-trailer system 200, which triggers the vehicle-trailer system 200 to autonomously follow the received planned path 102. In some examples, the UAV 300 follows the vehicle-trailer system 200 as it autonomously maneuvers to the selected available parking space 1-32 and continuously updates the planned path 102 based on continuously taking and analyzing the images the UAV 300 captures.

FIG. 5 shows an exemplary arrangement of operations for a method 500 that provides vehicle assistance to a vehicle (e.g., vehicle 202, or vehicle-trailer system 200) when parking in a parking lot, according to FIGS. 1-4B. In some implementations, at block 502, the method 500 includes receiving, at a path controller 260 (in some examples, the path controller 260 includes an ANN), one or more images 322. At block 504, the method 500 includes identifying, by the path controller 260, one or more available parking spaces 1-32 based on the received one or more images 322. At block 506, the method 500 includes displaying, on a user interface 230 in communication with the path controller 260, a representation 236 of the identified one or more available parking spaces 1-32. At block 508, the method 500 includes receiving, on the user interface 230, a driver selection 237 of a representation 236 of the identified one or more available parking spaces 1-32. At block 510, the method 500 includes determining, by the path controller 260, a path 102 from a current position of the vehicle 202, 200 to an available parking space 1-32 associated with the driver selection 237 of the representation 236 of the identified one or more available parking spaces 1-32. At block 512, the method 500 includes instructing, a drive system 210 of the vehicle 202, 200 in communication with the path controller 260, to autonomously drive the vehicle 202, 200 along the determined path 102.

In some implementations, the path controller 260 is supported by the vehicle 202, 200 and is part of the vehicle as shown in FIG. 2B. The path controller 260 may be supported by a UAV 300 that is configured to capture the images 322.

In some examples, the method 500 further includes receiving, at the path controller 260, sensor data 222 from a sensor system 220 in communication with the path controller 260. The sensor system 220 supported by the vehicle 202, 200 and configured to detect one or more objects within a proximity of the vehicle 202, 200. The method 500 also includes updating, by the path controller 260, the path 102 based on the received sensor data 222.

In some implementations, the method 500 includes transmitting the determined path 102, from the path controller 260 to a vehicle controller 240 in communication with the path controller 260. The vehicle controller 240 is in communication with a drive system 210 supported by the vehicle 202, 200 and executing a path following sub-system 248. The path following sub-system 248 executing at least one behavior 24a-248d causing the vehicle 202, 200 to autonomously maneuver along the determined path 102.

The method 500 may further include capturing, at one or more imaging devices 320 (e.g., a camera) in communication with the path controller 260, the one or more images 322. At least one of the one or more imaging devices 320 positioned at an altitude from the vehicle 202, 200 and capturing images 322 of a parking lot 100. In some examples, the one or more imaging devices 320 are positioned on a UAV 300 that maneuvers above the parking lot 100.

In some implementations, the method 500 further includes receiving, at the path controller 260 from the vehicle 202, 200, a size of the vehicle 202, 200, and identifying, by the path controller 260, the one or more available parking spaces 1-32 based on the received one or more images 322 and the received size of the vehicle 202, 200.

Figure 6A:
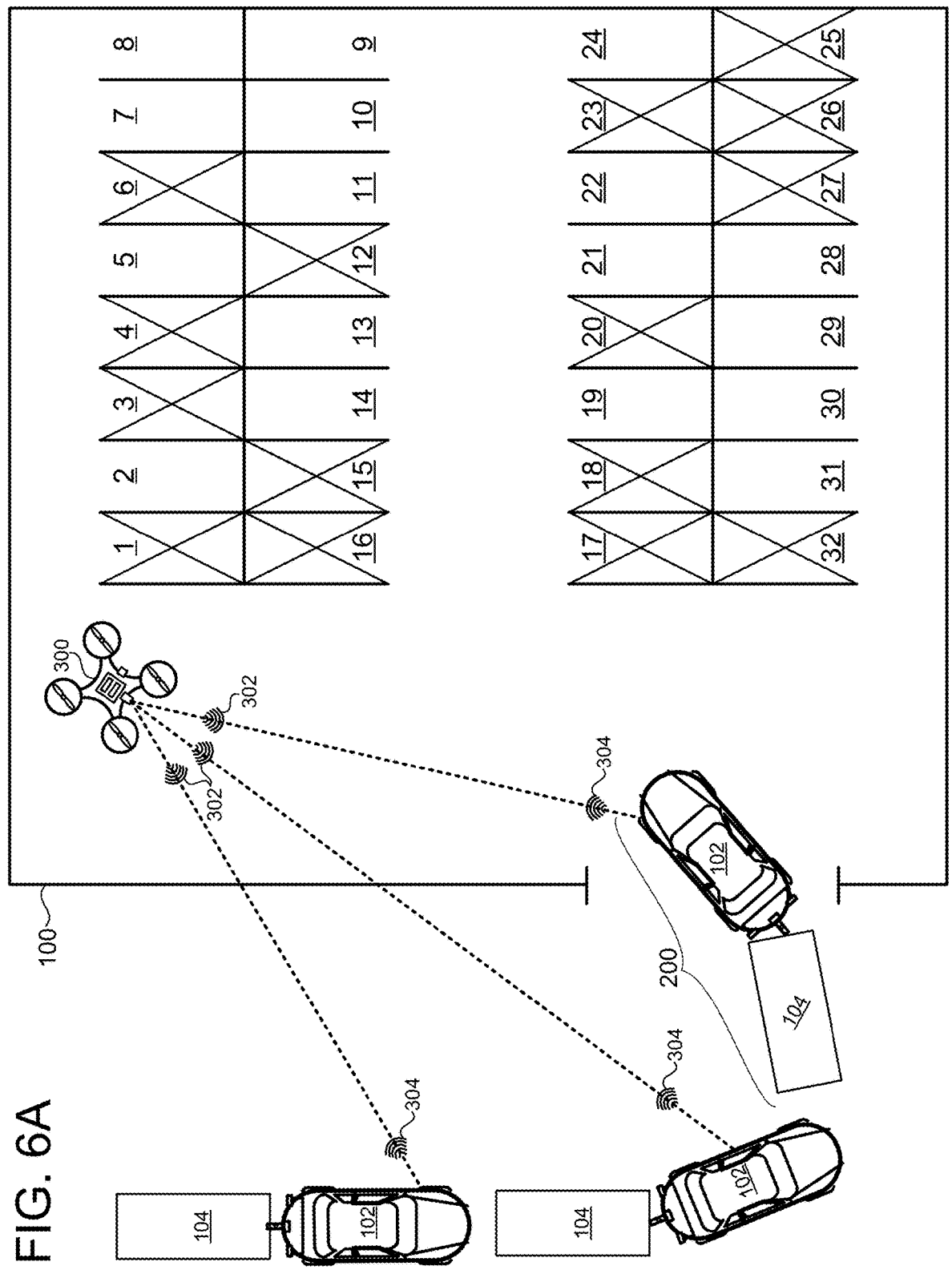
FIG. 6A is a schematic view of an exemplary UAV assisted system for vehicle reverse and parking having an unmanned aerial vehicle in communication with more than one vehicles.

Referring to FIG. 6A, in some implementations, the UAV 300 monitors the parking lot 100. In this case, the UAV 300 includes the object recognition system 250 and detects the available parking spaces 1-32, and one or more vehicle-trailer systems 200 near or within the parking lot 100. The UAV 300 communicates with the one or more vehicle-trailer systems 200 near or within the parking lot 100 the parking space information. In some examples, the UAV 300 is configured to prioritize the one or more vehicle-trailer systems 200 near or within the parking lot 100 such that each vehicle-trailer system 200 has sufficient time and space to park within the parking lot 100. In some examples, the UAV 300 may schedule incoming and outgoing vehicle-trailer systems 200 to avoid congestion and improve safety within the parking lot 100.

Figure 6B:
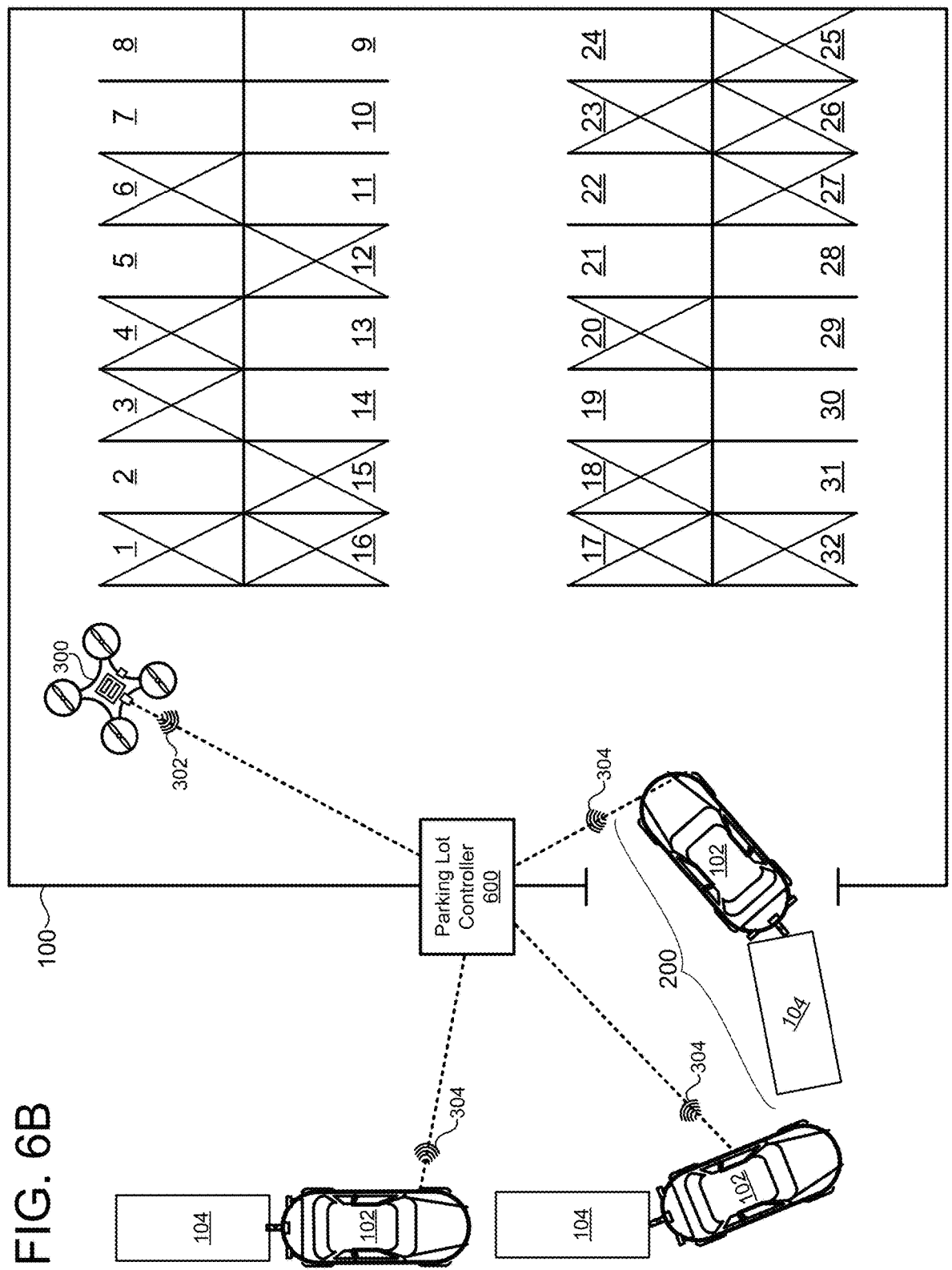
FIG. 6B is a schematic view of an exemplary unmanned aerial vehicle assisted system for vehicle reverse and parking having an unmanned aerial vehicle and one or more vehicles in communication by way of a parking lot controller.

Referring to FIG. 6B, in some examples, the UAV 300 captures images and sends them to a parking lot controller 600 that executed the object recognition system 250 which detects the available parking spaces 1-32, and one or more vehicle-trailer systems 200 near or within the parking lot 100. The parking lot controller 600 communicates with the one or more vehicle-trailer systems 200 near or within the parking lot 100 the parking space information. In some examples, parking lot controller 600 is configured to prioritize the one or more vehicle-trailer systems 200 near or within the parking lot 100 such that each vehicle-trailer system 200 has sufficient time and space to park within the parking lot 100. In some examples, the UAV 300 may schedule incoming and outgoing vehicle-trailer systems 200 to avoid congestion and improve safety within the parking lot 100.

FIG. 7 shows an exemplary arrangement of operations for a method 700 for determining a vehicle path associated with a vehicle system (e.g., a vehicle 202, or a vehicle-trailer system 200) for parking in a parking lot 100, according to FIGS. 6A and 6B.

At block 702, the method 700 includes capturing, at an imaging device 320, one or more images 322 of a parking lot 100 having one or more available parking spaces 1-32 and one or more unavailable parking spaces 1-32. The imaging device 320 may be supported by a UAV 300. At block 704, the method 700 includes receiving, at a path controller 260 in communication with the imaging device 320, the one or more captured images 322. In some examples, the path controller 260 is supported by the UAV 300. However, the path controller 260 may be a standalone controller in communication with the imaging device 320 via a wireless network. At block 706, the method 700 includes identifying, by the path controller 260, the one or more available parking spaces 1-32 based on the received one or more images 322. At block 708, the method 700 includes receiving, at the path controller 260 from one or more vehicles 200, 202, vehicle information associated with each one of the one or more vehicles 200, 202. The vehicle 200, 202 information includes a vehicle identifier identifying the vehicle 200, 202, (for example a vehicle identification number), a vehicle size (e.g., the size of the vehicle 200, 200 and or vehicle-trailer system 200), and a vehicle position. The vehicle position may be in a coordinate system or with respect to a predefined position such as the entrance of the parking lot 100. For each vehicle, at block 710, the method 700 includes determining, by the path controller 260, a path 102 from the vehicle position associated with the vehicle information to an identified available parking space 1-32 from the one or more identified available parking spaces. The identified available parking space sized to accommodate the vehicle 202, 202 based on the vehicle size. At block 712, the method 700 includes transmitting, from the path controller 260 to each vehicle 200, 202, the determined path 102 associated with a respective vehicle. The path controller 260 may communicate with the vehicle 200, 202 by way of a wireless network.

In some implementations, the method 700 also includes receiving, at the path controller 260, sensor data 232 from a sensor system 220 of the vehicle 200, 202. The sensor system 220 is supported by the vehicle system 200, 202 and configured to detect one or more objects within a proximity of the vehicle system 200, 202. In some examples, the method 700 also includes transmitting the determined path 102 from the path controller 260 to a vehicle controller 240 in communication with a drive system 210 supported by the vehicle system 200, 202 and executing a path following sub-system 248 causing the drive system 210 to autonomously maneuver the vehicle system 200, 202 along the determined path 102

The system as described above relates to a vehicle-trailer system 200 having a vehicle 202 and a trailer 204 connected by way of a hitch 206. However, the system may apply to any vehicle that is not connected to a trailer. For example, the system may be applied to one or more vehicles entering a parking lot to park.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of determining a vehicle path for a vehicle system for parking in a parking lot, the method comprising:
   receiving, at a path controller, one or more live images of the parking lot;
   identifying, by the path controller, one or more available parking spaces based on the one or more live images of the parking lot;
   displaying, on a user interface in communication with the path controller, one or more representations of the identified one or more available parking spaces;
   receiving, on the user interface, a human operator input indicating a selection of a representation from the one or more representations of the identified one or more available parking spaces;
   determining, by the path controller, a path from a current position of the vehicle system to an available parking space associated with the driver selection of the representation of the identified one or more available parking spaces; and
   instructing, a drive system of the vehicle system in communication with the path controller, to autonomously drive the vehicle system along the determined path,
   wherein an unmanned aerial vehicle captures, at one or more imaging devices in communication with the path controller, the one or more live images, at least one of the one or more imaging devices positioned at an altitude from the vehicle system and capturing live images of the parking lot, and
   wherein the unmanned aerial vehicle communicates with the path controller by way of a wireless network.

2. The method of claim 1, wherein the path controller is supported by the vehicle system.

3. The method of claim 1, wherein the path controller communicates with the drive system of the vehicle system by way of a wireless network.

4. The method of claim 1, further comprising:
   receiving, at the path controller, sensor data from a sensor system in communication with the path controller, the sensor system supported by the vehicle system and configured to detect one or more objects within a proximity of the vehicle system; and
   updating, by the path controller, the path based on the received sensor data.

5. The method of claim 1, further comprising:
   transmitting the determined path, from the path controller to a vehicle controller in communication with the path controller, the vehicle controller in communication with the drive system supported by the vehicle system and executing a path following sub-system, the path following sub-system executing at least one behavior causing the vehicle system to autonomously maneuver along the determined path.

6. The method of claim 1, wherein the vehicle system comprises a vehicle and a trailer.

7. The method of claim 1, further comprising:
   receiving, at the path controller from the vehicle system, a size of the vehicle system; and
   identifying, by the path controller, the one or more available parking spaces based on the one or more live images and the received vehicle system size.

* * * * *